United States Patent Office
3,197,480
Patented July 27, 1965

3,197,480
2 AND 2,4-(ALPHA HYDROXYPOLYPERHALOCYCLOALKYL) - THIOPHENES, PYRROLES, AND FURANS; 2 AND 2,4 - [(ALPHA HYDROXYALPHA,ALPHA DIPOLYPERHALO HYDROCARBON) METHYL]-THIOPHENES, PYRROLES AND FURANS AND PROCESS FOR MAKING THEM
David C. England, Wilmington, Del., assignor to E. I. du Pont de Nemours and Company, Wilmington, Del., a corporation of Delaware
No Drawing. Filed Dec. 12, 1962, Ser. No. 244,007
18 Claims. (Cl. 260—326.5)

This invention relates to a new class of hydroxypolyfluoroperhalo- and hydroxy - ω - hydropolyfluoroperhalo-substituted heterocyclic compounds. More specifically, it relates to α-mono- and α,α'-bis(polyfluoroperhalohydrocarbon-, -ω-hydropolyfluoroperhalohydrocarbon-, and - polyfluoroperhaloalkylene)hydroxymethyl - substituted pyrroles, furans, and thiophenes. It has as its principal objects provision of these new compounds and of a method for the preparation thereof. This application is a continuation-in-part of my copending application Serial No. 4,619, filed January 26, 1960, and now abandoned.

In my copending application Serial No. 782,616, filed December 24, 1958, now U.S. Patent 3,036,091, it is disclosed that wholly carbon chain, 1,3-conjugated dienes readily undergo Diels-Alder addition with and across the ring carbonyl of the 3,3,4,4-tetrafluoro-2,2-dihalocyclobutanones to form the new 1,1,2,2-tetrafluoro-3,3-dihalo-5-oxaspiro[3.5]non-7-enes. This reaction not only occurs readily but in many instances spontaneously and exothermically to afford high yields of the new oxaspirononenes. In fact, in the case of the more reactive wholly carbon chain dienes and tetrafluorodihalocyclobutanones, the reaction occurs so readily that it is spontaneous and exothermic even at solid carbon dioxide temperatures.

It has also been discovered (see the copending, coassigned application of Harris, Serial No. 152,663, filed November 15, 1961, now U.S. Patent 3,136,786) that wholly carbon chain 1,3-conjugated dienes readily undergo Diels-Alder addition with and across the ring carbonyl of acyclic α-fluoropolyhaloalkylketones to form 6,6 - di(α - fluoropolyhaloalkyl) - 5,6 - dihydro - 2H-pyrans. This reaction is accomplished by bringing the reactants together under the influence of chemically activating energy such as heat or ultraviolet irradiation.

Quite surprisingly, it has now been found that the oxa-, aza-, or thia-five-membered ring, heterocyclic, conjugated 1,3-dienes and substituted such five-membered ring, heterocyclic, conjugated 1,3-dienes readily, and in some cases spontaneously, undergo reaction with polyfluoroperhalo and ω-hydropolyfluoroperhalo acyclic and cyclic ketones to afford good yields of α-mono- and α,α'-bis(polyfluoroperhalo-, -ω-hydropolyfluoroperhalo-, and -polyfluoroperhaloalkylenehydroxymethyl)-substituted oxa-, aza-, or thia-five-membered ring, heterocyclic, 1,3-conjugated dienes and substituted dienes, depending on the stoichiometry and the number of hydrogen-bearing ring carbons alpha to the ring heteroatom.

Thus, if one molar proportion of polyfluoroperhalo- and ω-hydropolyfluoroperhaloketone is used with respect to an α-hydrogen-bearing heterocyclic diene, a mono-substituted product is obtained. Correspondingly, if two molar proportions of the polyfluoroperhalo- and ω-hydropolyfluoroperhaloketone coreactant are used with an α,α'-dihydrogen-bearing heterocyclic diene, the α,α'-bis(polyfluoroperhalo-, -ω-hydropolyfluoroperhalo-, and -polyfluoroperhalocycloalkylene)-substituted product is obtained. The preparative reactions and the new products thereby obtained are illustrated in further detail by the following two equations:

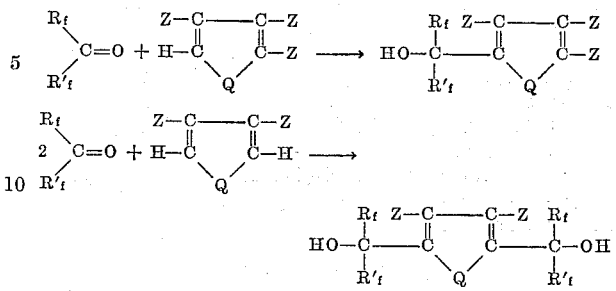

in which Q is used to represent —O—, —NH—, or —S—; $R_f$ and $R'_f$ are used to represent polyfluoroperhalo wholly carbon chain radicals, alike or different, of generally no more than 8 carbons each, at least one of which has two fluorine atoms on α-carbon, any halogen other than fluorine being of atomic number 17–35, inclusive, which radicals can be together joined to form with the intervening carbon a polyfluoroperhalo cyclic structure of 4–6 ring members and ω-hydropolyfluoroperhalo wholly carbon chain radicals, alike or different, of 2 to 31 chain carbons, at least one of which has two fluorine atoms on α-carbon, any halogen other than fluorine being of atomic number 17–35, inclusive; and Z is used to represent hydrogen, nitro, halogen, R'CO—, R'COO— and R'O— wherein R' is hydrocarbon of no more than 8 carbons each.

The following examples in which the parts given are by weight are submitted to further illustrate but not to limit the present invention.

*Example I*

A thick-walled glass reactor, approximately 24 diameters long and of internal capacity corresponding to about 150 parts of water, was evacuated, cooled in a liquid nitrogen bath, and charged with 42 parts of perfluorocyclobutanone (for preparation, see Examples IV, V, and VI of my copending application Serial Number 717,805) and 16 parts (an equimolar proportion based on the ketone) of furan containing a trace of phenothiazine as a polymerization inhibitor. The glass reactor was sealed, allowed to warm to room temperature, and finally heated for one hour at steam bath temperatures. At the end of this time refluxing of the reaction mixture had ceased. The reactor was then cooled in a liquid nitrogen bath, opened, and the dark-colored, liquid reaction mixture removed. Upon distillation, there was obtained 34.8 parts (60% of theory) of 2,2,3,3,4,4-hexafluoro-1-(2-furyl)-cyclobutanol as a clear, colorless liquid boiling at 58° C. under a pressure corresponding to 10 mm. of mercury; $n_D^{25}$, 1.3930. Infrared and nuclear magnetic resonance spectra were wholly consistent with the furylhexafluorocyclobutanol structure.

Analysis.—Calcd. for $C_8H_4F_6O_2$: C, 39.1%; H, 1.6%; F, 46.3%. Found: C, 39.1%; H, 1.8%; F, 46.6%.

The remaining higher boiling material was roughly distilled and, on cooling, the distillate partially solidified. Recrystallization from n-hexane afforded approximately one part of 2,5-furylenebis(2,2,3,3,4,4-hexafluorocyclobutanol) as white crystals melting at 78.0–79.5° C.

The reaction was repeated using eight parts of furan and 43 parts (2.0 molar proportions based on the furan) of perfluorocyclobutanone. After charging and sealing as before, the reactor was allowed to warm to room temperature and allowed to stand under these conditions overnight. The reactor was then heated to steam bath temperature, but no reflux occurred, indicating that reaction had been completed. The reactor was cooled to liquid nitrogen temperatures, opened, and the liquid reaction product removed. Upon distillation, there was obtained ten parts (34% of theory) of 2,2,3,3,4,4-hexafluoro-1-(2-furyl)cyclobutanol as a clear, colorless liquid boiling at 58° C. under a pressure corresponding to 10 mm. of mercury and 19.5 parts (38% of theory) of 9-(2,2,3,3,4,4-hexafluoro - 1 - hydroxy - cyclobutyl) - 6,9-epoxy-2,2,3,3,4,4-hexafluoro-5-oxaspiro[3.5]-non-7-ene as a clear, colorless liquid boiling at 90° C. under a pressure corresponding to 10 mm. of mercury; $n_D^{25}$, 1.3714. The infrared and nuclear magnetic resonance spectra were wholly consistent with the 2,2,3,3,4,4-hexafluoro-1-(6,9-epoxy-2,2,3,3,4,4-hexafluoro-5-oxaspiro[3.5]non - 7 - en-9-yl)-cyclobutanol structure. This product can also be named (1-hydroxy-2,2,3,3,4,4,-hexafluorocyclobutyl)-2,4-ethano-1,3-dioxolane - 5 - spiro - 1′,2′,,2′,3′,3′,4′,4′ - hexafluorocyclobutane and also 4-(1-hydroxyhexafluorocyclobutyl)-2,7-dioxabicyclo-[2.2.1]heptane-3-spiro - 1′ - hexafluorocyclobutane.

*Analysis.*—Calcd. for $C_{12}H_4F_{12}O_3$: C, 34.0%; H, 1.0%; F, 53.8%. Found: C, 34.2%; H, 1.1%; F, 54.2%.

Upon continued distillation, there was obtained 10.8 parts (21% of theory, making a total yield of 93% of theory based on furan) of crude 2,5-furylenebis(2,2,3,3,-4,4-hexafluorocyclobutanol) as a clear, colorless liquid, boiling at 110° C. under a pressure corresponding to 10 mm. of mercury, which solidified on standing. Recrystallization from n-hexane afforded the pure furylenebis(hexafluorocyclobutanol) as white crystals melting at 78.0-79.5° C. The infrared and nuclear magnetic resonance spectra were wholly consistent with the furylenebis(hexafluorocyclobutanol) structure.

*Analysis.*—Calcd. for $C_{12}H_4F_{12}O_3$: C, 34.0%; H. 1.0%; F. 53.8%. Found: C, 33.9%; H, 1.0%; F, 53.9%.

*Example II*

As in Example I, an identical thick-walled glass reactor was cooled in a liquid nitrogen bath and charged with a mixture of 16 parts of perfluorocyclobutanone and six parts (an equimolar proportion based on the ketone) of freshly distilled pyrrole. The reactor was sealed and allowed to warm to room temperature, during which time a vigorous reaction occurred. The reactor was then cooled to liquid nitrogen temperatures, opened, and the liquid reaction mixture removed. Upon distillation, there was obtained 6.6 parts (30% of theory) of 2,2,3,3,4,4,-hexafluoro-1-(2-pyrrolyl)cyclobutanol as a clear, colorless liquid boiling at 103° C. under a pressure corresponding to 50 mm. of mercury. On standing, the pyrrolyl-hexafluorocyclobutanol solidified and, after recrystallization from n-hexane, was obtained as white crystals melting at 53–55° C. The infrared and nuclear magnetic resonance spectra were wholly consistent with the pyrrolyl-hexafluorocyclobutanol structure.

*Analysis.*—Calcd. for $C_8H_5F_6NO$: C, 39.2%; H, 2.1%; F, 46.5%; N, 5.7%. Found: C, 39.2%; H, 2.3%; F. 46.5%; N, 5.7%.

Continued distillation afforded 10.8 parts (57% of theory, making a total of 87% of theory based on pyrrole) of 2,5-pyrrolylenebis(2,2,3,3,4,4-hexafluorocyclobutanol) as a clear, colorless liquid boiling at 141° C. under a pressure corresponding to 24 mm. of cercury. On standing, the product solidified and after recrystallization from n-hexane was obtained as white crystals melting at 101–102° C. Infrared and nuclear magnetic resonance spectra were wholly consistent with the pyrrolyenebis(hexafluorocyclobutanol) structure.

*Analysis.*—Calcd. for $C_{12}H_5F_{12}NO_2$: C, 34.1%; H, 1.2%; F, 53.9%; N, 3.3%. Found: C. 34.4%; H, 1.4%; F, 53.3%; N, 3.3%.

*Example III*

As in Example I, an identical heavy-walled glass reactor was cooled in a liquid nitrogen bath and charged with nine parts of thiophene and 19 parts (1.0 molar proportion based on the thiophene) of perfluorocyclobutanone. The reactor was sealed and allowed to warm to room temperature. The reaction mixture was immiscible under these conditions. The reactor was then heated on a steam bath for two hours, at which time the reaction mixture was homogeneous, even when cooled to room temperature. The reactor was then heated for an additional 16 hours on the steam bath, cooled in a liquid nitrogen bath, opened, and the liquid reaction mixture removed. Upon distillation, there was obtained 25 parts (89% of theory) of 2,2,3,3,4,4,-hexafluoro-1-(2-thienyl)-cyclobutanol as a clear, colorless liquid boiling at 73° C. under a pressure corresponding to 8 mm. of mercury; $n_D^{25}$, 1.4386. The nuclear magnetic resonance and infrared spectra were wholly consistent with the thienyl-hexafluorocyclobutanol structure.

*Analysis.*—Calcd. for $C_8H_4F_6SO$: C, 36.7%; H, 1.5%; F, 43.5%; S, 12.2%. Found C, 37.2%; H, 1.9%; F, 43.1%; S, 12.2%.

The reaction was repeated under the same conditions, varying only in that 8.5 parts of thiophene and 36 parts (2.0 molar proportions based on the thiophene) of perfluorocyclobutanone were used. On similar workup, there was obtained 20 parts (77% of theory) of 2,2,3,3,4,4-hexafluoro-1-(2-thienyl)-cyclobutanol and 4.8 parts (11% of theory, making a total of 88% of theory based on thiopene) of 2,5-thienylenebis-(2,2,3,3,4,4-hexafluorocyclobutanol) as a clear, colorless liquid boiling at 93° C. under a pressure corresponding to 1 mm. of mercury. The product solidified and, after recrystallization from carbon tetrachloride, was obtained as white crystals melting at 93–95° C. The infrared and nuclear magnetic resonance spectra were wholly consistent with the thienylene-bis(hexafluorocyclobutanol) structure.

*Analysis.*—Calcd. for $C_{12}H_4F_{12}SO_2$: C, 32.7%; H, 0.9%; F, 51.8%; S, 7.3%. Found: C, 32.9%; H, 1.4%; F, 51.1%; S, 7.2%.

The thienylhexafluorocyclobutanol was further characterized by conversion to 2-(4H-hexafluorobutyryl)thiophene and ultimately by conversion to 2-thienylcarboxylic acid. Thus, a mixture of 18.7 parts of 2,2,3,3,4,4-hexafluoro-1-(2-thienyl)cyclobutanol, five parts of sodium carbonate, and 45 parts of water was refluxed for five minutes, cooled, and extracted with ether. The ether layer was dried over anhydrous calcium sulfate and the ether removed by distillation. Continued distillation afforded 15.8 parts (85% of theory) of 2-(4H-hexafluorobutyryl)-thiophene, which can also be named as 3H-hexafluoropropyl 2-thienyl ketone, as a clear, colorless liquid boiling at 47° C. under a pressure corresponding to 1 mm. of mercury; $n_D^{25}$, 1.4548. The infrared and nuclear magnetic resonance spectra were wholly consistent with the ω-hydroper-fluorobutyrylthiophene structure.

*Analysis.*—Calcd. for $C_8H_4F_6SO$: F, 43.5%; S, 12.2%. Found: F, 43.6%; S, 12.4%.

The above ω-hydroperfluorobutrylthiophene was heated in 10 parts of 10% aqueous potassium hydroxide solution until all gas evolution had ceased. The clear solution was then acidified with hydrochloric acid, and the resultant white solid was removed by filtration. There was thus obtained 2-thienylcarboxylic acid which, after recrystallization from chloroform, was obtained as long white needles melting at 125–127° C. versus a reported melting point of 129–130° C., see page 500, vol. IV, Heilbron, "Dictionary of Organic Compounds," Oxford University Press (1953).

*Analysis.*—Calcd. for $C_5H_4SO_2$: N.E., 128. Found: N.E., 130, 131.

*Example IV*

As in Example I, an identical glass reactor was cooled in a liquid nitrogen bath and charged with a mixture of eleven parts of furfural and 40 parts (2.3 molar proportions based on the furfural) of perfluorocyclobutanone. The reactor was sealed, allowed to warm to room temperature, heated for 60 hours at steam bath temperature, then cooled to liquid nitrogen temperatures, opened, and the reaction mixture removed. Upon distillation at room temperature there was recovered two parts (5% recovery) of perfluorocyclobutanone. The resultant viscous, black residue was further distilled, at higher temperatures and with difficulty, to afford five additional parts (12.5% recovery, making a total of 17.5% recovery) of perfluorocyclobutanone and 11 parts (35% of theory) of crude 2,2,3,3,4,4-hexafluoro-1-(5-formyl-2-furyl)cyclobutanol as a liquid boiling above 94° C. under a pressure corresponding to 5 mm. of mercury, which solidified on standing. After recrystallization from carbon tetrachloride, the pure 2,2,3,3,4,4 - hexafluoro - 1-(5-formyl-2-furyl)cyclobutanol was obtained as white crystals melting at 103.0–104.5° C. The infrared and nuclear magnetic resonance spectra were wholly consistent with the 2,2,3,3,4,4-hexafluoro-1-(5-formyl-2-furyl)cyclobutanol structure.

*Analysis.*—Calcd. for $C_9H_4F_6O_3$: C, 39.5%; H, 1.5%; F, 41.6%. Found: C, 39.3%; H, 1.7%; F, 41.4%.

*Example V*

A pressure-resistant reaction vessel fabricated from a commercially available alloy of nickel, iron, and molybdenum (known to the trade as "Hastelloy C") and of internal capacity corresponding to 240 parts of water was cooled in a liquid nitrogen bath and charged with 50 parts of furan and 42 parts of hexafluoroacetone. The reactor was then sealed, heated at autogenous pressure at 150° C. for eight hours, and then cooled to room temperature and vented to the atmosphere. The resultant liquid product was distilled through an 18 inch spinning band column (U.S. Patent 2,712,520) to afford 37 parts (60% of theory) of $\alpha,\alpha$-bis(trifluoromethyl)furfuryl alcohol as a colorless liquid boiling at 136.0–136.5° C.; $n_D^{25}$, 1.3669. The $F^{19}$ nuclear magnetic resonance spectrum at 56.4 megacycles of the product, which can also be identified as $\alpha,\alpha$ - bis - (trifluoromethyl)-2-furylmethanol, showed a singlet at 650 cps. relative to 1,2-difluorotetrachloroethane.

*Analysis.*—Calcd. for $C_7H_4F_6O_2$: C, 35.9%; H, 1.7%; F, 48.7%. Found: C, 36.2%; H, 1.9%; F, 46.9%.

*Example VI*

A pressure-resistant reaction vessel similar to that in the foregoing Example V, varying only in being of internal capacity corresponding to 145 parts of water, was cooled in a liquid nitrogen bath and charged with 42 parts of thiophene and 42 parts of hexafluoroacetone, and the reactor then sealed and heated under autogenous pressure at 150° C. for three hours and at 200° C. for five hours. The reactor was then allowed to cool to room temperature, vented to the atmosphere, and the liquid product removed and purified by distillation under reduced pressure. There was thus obtained 11.55 parts (18.5% of theory) of $\alpha,\alpha$-bis(trifluoromethyl)-2-thienylmethanol as a clear, colorless liquid boiling at 51–52° C. under a pressure corresponding to 10 mm. of mercury; $n_D^{25}$, 1.4158. The $F^{19}$ nuclear magnetic resonance spectrum of the product exhibited a singlet, unsplit resonance line.

*Analysis.*—Calcd. for $C_7H_4F_6OS$: C, 33.6%; H, 1.6%; F, 45.6%; S, 12.8%. Found: C, 34.0%; H, 1.8%; F, 45.0%; S, 13.2%.

*Example VII*

A pressure-resistant reaction vessel as in Example V was likewise charged with 42 parts of hexafluoroacetone and 50 parts of pyrrole, sealed, and heated under autogenous pressure at 100° C. for eight hours. The reactor was then allowed to cool to room temperature, vented to the atmosphere, and the liquid product purified by distillation under reduced pressure. There was thus obtained 45.2 parts (78% of theory) of $\alpha,\alpha$-bis(trifluoromethyl)-2-pyrrolylmethanol as a colorless liquid boiling at 58–59° C. under a pressure corresponding to 10 mm. of mercury; $n_D^{25}$, 1.4024. The $F^{19}$ nuclear magnetic resonance spectrum at 56.4 megacycles exhibited a singlet band at 600 cycles/second relative to 1,2-difluorotetrachloroethane.

The infrared spectrum of the product contained absorption bands at 2.8 and 2.9 m$\mu$ characteristic for the NH and OH groups.

*Analysis.*—Calcd. for $C_7H_5F_6NO$: C, 36.1%; H, 2.2%; F, 48.9%; N, 6.0%. Found: C, 36.5%; H, 2.5%; F, 48.4%; N, 7.2%.

The present invention is generic to the $\alpha$-mono- and $\alpha,\alpha'$ - bis(polyfluoroperhalo-, -$\omega$-hydropolyfluoroperhalo-, and -polyfluoroperhalocycloalkylenehydroxymethyl)-substituted pyrroles, furans, and thiophenes. The invention is likewise generic to the preparation of these new substituted pyrroles, furans, and thiophenes by the direct addition reaction between the requisite $\alpha$-mono- and $\alpha,\alpha'$-dihydrogen-bearing pyrrole, furan, and thiophene and the requisite polyfluoroperhalo acyclic, $\omega$-hydropolyfluoroperhalo acyclic, and polyfluoroperhalo acyclic ketones in which at least one carbon alpha to the ketone carbonyl carries two fluorines and in which any halogen, other than fluorine, is of atomic number 17–35, inclusive. These products can also be named by the additive technique as heterocyclyl $\alpha,\alpha$-disubstituted methanols, i.e., generically as $\alpha,\alpha$-bis(polyfluoroperhalohydrocarbyl-, -$\omega$-hydropolyfluoroperhalohydrocarbyl-, and -polyfluoroperhalocycloalkylene)-2-furyl-, -2-pyrrolyl-, and -2-thienylmethanols and $\alpha,\alpha,\alpha',\alpha'$-tetrakis(polyfluoroperhalohydrocarbyl-, -$\omega$-hydropolyfluoroperhalohydrocarbyl-, and -polyfluoroperhalocycloalkylene)-2,5-furylene-, -2,5-pyrrolylene-, and -2,5-thienylenedimethanols.

The $\alpha$-hydrogen of the five-membered heterocyclic coreactant adds across the ring carbonyl of the polyfluoroperhalo- and $\omega$-hydropolyfluoroperhaloketone coreactant, with the hydrogen adding to the oxygen of the carbonyl group of the ketone forming an hydroxyl group, and the remaining valence bond of the carbonyl double bond of the ketone coreactant adding simultaneously to the $\alpha$-carbon of the heterocycle from which the hydrogen came. Thus, the radical pendent on the $\alpha$- or 1-carbon of the $\alpha,\alpha$-di(polyfluoroperhalohydrocarbyl-, -$\omega$-hydropolyfluoroperhalohydrocarbyl-, or polyfluoroperhalocyclohydrocarbylene)-hydroxymethyl moiety of the product is the monovalent radical resulting from the removal of one $\alpha$-hydrogen from the starting pyrrole, furan, or thiophene coreactant structure. Similarly, the same applies in the case of the furans, pyrroles, and thiophenes, carrying hydrogen on both the $\alpha$- and $\alpha'$-carbons except that two molecules of the polyfluoroper- and $\omega$-hydroperhaloketone react, if enough has been charged, each in the same fashion as just described with the final product having two of the substituted hydroxymethyl substituents, one on each of the $\alpha$- and $\alpha'$-carbons of the heterocycle.

The reaction is a simple one and requires no complicated operating procedures or equipment. Generally the reaction is carried out is sealed reactors, of which the most convenient are glass or glass-lined reactors. Because of the relatively low boiling nature of some of the polyfluoroper- and $\omega$-hydroperhaloketones and likewise because of the extreme chemical reactivity of these compounds, e.g., with, for instance, water, and especially with some of the present coreactants, the reaction will generally be carried out by cooling the reactor to liquid nitrogen temperatures or at least to those of solid carbon dioxide (about $-80°$ C.), charging the particular polyfluoroper- and $\omega$-hydroperhaloketones involved as well as the $\alpha$-hydrogen-bearing pyrrole, furan, or thiophene coreactant, purging the reaction vessel with nitrogen, sealing, and allowing the reactor to warm slowly to room temperature. With the higher boiling ketones, sealed systems are not normally used. The reaction will simply be carried out under anhydrous conditions. Elevated temperatures up to 150–200° C. can be and sometimes must be used.

The addition reaction is effected thermally. Depending on the relative reactivity of the fluoroketone coreactant and the $\alpha$-hydrogen-containing pyrrole, furan, or thiophene coreactants, the necessary reaction temperatures and reaction times will vary. With the more reactive pairs, the reaction is spontaneous and exothermic, sometimes even at low temperatures. Accordingly, appropriate care should be taken in charging the reactants. Normally temperatures in the range 75–80° C. will suffice for most of the systems. Reaction times will vary from a few minutes to a few hours. In the case of the less reactive systems, higher temperatures and longer reaction times, e.g., a few days, will be needed. Temperatures higher than in the range 150–200° C. will normally not be required. Under these conditions even with the less reactive systems reaction times required will be at most a few hours to a few days. For convenience, an overnight period is frequently used. In those instances wherein the reaction is carried out in a sealed reactor at temperatures above the boiling points of the ketones, the reaction will, of course, be affected at elevated pressures. No externally applied pressure is required. The simple autogenous pressure of the reactants under the temperature conditions used will suffice. In the case of the acyclic polyfluoroperhalo- and ω-hydropolyfluoroperhaloketone coreactants which generically exhibit a significantly lower order of reactivity compared with the cyclic ketones, it frequently will be helpful to use a catalyst for the reaction. The same applies in those instances where the heterocyclic coreactant carries either significant numbers of or a significantly large substituent of the aforesaid described types and particularly where any ring substituents on the heterocyclic coreactant are electron withdrawing. Generically, this addition reaction across the carbonyl moiety of the fluoroketones is best catalyzed by the use of a Lewis acid, e.g., aluminum chloride, stannous chloride, $BF_3$, and the like. $BF_3$ and its sources are particularly useful.

The reaction mixtures are worked up quite simply to obtain the polyfluoroper- and polyfluoro-ω-hydroperhalohydroxymethyl heterocycles. Thus at the completion of the reaction it is only necessary to open the reactor, distill away any unreacted polyfluoroper- or ω-hydroperhaloketone or pyrrole, furan, or thiophene coreactant, and isolate and purify the desired products.

The reaction can be effected properly in the presence or absence of an inert organic reaction medium, which, if present, should be anhydrous. Any inert liquid organic diluent can be used and, generally speaking, the most common are the normally liquid hydrocarbons, polyfluorohydrocarbons, and ethers, including aliphatic and aromatic compounds such as the hexanes, heptanes, octanes, and the like; benzene, toluene, the xylenes, and the like; cycloaliphatic hydrocarbon solvents such as cyclohexane and the like; hydrocarbon ethers such as dipropyl and dibutyl ethers, and the like; the polyfluoroaliphatic hydrocarbons, e.g., 1,1,2,2-tetrafluoro-3,3-dimethylbutane, and the like; the polyfluoroaliphatic/cycloaliphatic hydrocarbons, e.g., perfluorodimethylcyclohexane, and the like. The choice of the particular diluent, if used, is not at all critical and will vary with such other normal variables as the temperature found necessary to effect reaction. In most instances, in order to simplify the reaction, no diluent is used. The requisite polyfluoroper- and ω-hydroperhaloketone and α-hydrogen-containing pyrrole, furan, or thiophene coreactants are simply mixed and heated together as described previously and the product isolated therefrom after the reaction has been completed. The absence of a diluent generally makes separation of unreacted material and the desired products easier.

From the foregoing it is apparent that, in preparing the new polyfluoroperhalohydroxycycloalkylene - substituted products there can be used any 3,3,4,4-tetrafluoro-2,2-dihalocyclobutanone wherein the two halogen substituents are of atomic number from 9 to 35, inclusive, i.e., fluorine, chlorine, and bromine, alike or different. More specifically, there can be used perfluorocyclobutanone, 2-chloro-2,3,3,4,4-pentafluorocyclobutanone, 2 - bromo - 2,3,3,4,4-pentafluorocyclobutanone, 2-bromo-2-chloro-3,3,4,4-tetrafluorocyclobutanone, 2,2-dichloro-3,3,4,4-tetrafluorocyclo-butanone, and 2,2-dibromo-3,3,4,4-tetrafluorocyclobutanone.

Of these polyfluoroperhalocyclobutanones, the various chlorofluorocyclobutanones have been disclosed in U.S. Patents 2,712,554 and –5, although no detailed method for the preparation thereof is given. Perfluorocyclobutanone is a new compound per se as disclosed and claimed in my copending application, Serial No. 757,701, filed August 28, 1958, now U.S. Patent 3,039,955, a continuation-in-part of my application Serial No. 717,805, filed February 27, 1958, and now abandoned. All of these polyfluoroperhalocyclobutanones can be readily prepared by the cycloaddition reaction between perfluorovinyl hydrocarbyl ethers with the requisite 1,1-dihalo-2,2-difluoroethylenes followed by hydrolysis of the resultant 1-hydrocarbyloxy-1,3,3,4,4 - pentafluoro-2,2-dihalocyclobutanes, all as disclosed and claimed in detail in the above-referred to copending application of England, Serial No. 717,805, now abandoned, and the copending continuation-in-part application thereof, Serial No. 43,331, filed July 18, 1960, now U.S. Patent 3,129,248. The disclosure of that application, particularly detailed Examples I–X, is specifically incorporated by reference herein. These cyclobutanones are generically gaseous to liquid, depending on the total molecular weight which varies with the halogens, quite reactive materials which should preferably be handled under anhydrous conditions.

Other cyclic polyfluoroperhaloketones containing at least one α-$CF_2$ group can also be used as coreactants such at the polyfluoroperhalo aliphatic ketones, e.g., perfluorocyclopentanone. Similarly, other acyclic polyfluoroperhaloketones containing at least one α-$CF_2$ group can also be used as coreactants such as unsymmetrical tetrachlorodifluoroacetone, i.e., 1,1,1,2-tetrachloro-2,2-difluoroacetone; perfluoroethyl perfluoropropyl ketone, i.e., perfluorohexane-3-one; perfluoroacetone, perfluoromethyl-perfluoropropyl ketone, i.e., perfluoropentan-2-one, 1,1-dibromo-1,2,2,2-tetrafluoroacetone, bis-perfluoropropyl ketone, i.e., perfluoroheptan - 4 - one; the polyfluoroperhalogeno aliphatic/cycloaliphatic ketones containing at least one α-$CF_2$ group, e.g. perfluorocyclohexyl perfluoromethyl ketone, and the like.

Also useful as coreactants with the requisite α- and/or α,α'-mono- and dihydrogen-bearing furans, pyrroles, and thiophenes and the aforesaid described α- and α,α'-mono- and dihydrogen-bearing ring substituted furans, pyrroles, and thiophenes are the ω-hydropolyfluoroperhaloketones containing at least one, and preferably two, α-$CF_2$ group. A preferred class of this type of ketone are those frequently referred to as the telomer ketones as derived from telomerization reactions with the polyfluoroperhaloethylenes, e.g., tetrafluoroethylene and the like, as described in greater detail in U.S. Patent 3,029,252, in which each of the ω-hydropolyfluoroperhalohydrocarbon radicals pendent on ketone carbonyl will have from two to 31 carbons. Suitable specific examples of this type of ketone include, for instance, bis(12H - tetracosafluorododecyl) ketone, i.e., 1H,25H-octatetracontafluoro-13-pentacosanone; bis-(2H-hexafluoroisopropyl) ketone; bis(7H-tetradecafluoroheptyl) ketone, i.e., 1H,15H-octacosafluoro-8-pentadecanone; bis(6H-dodecafluorohexyl) ketone, i.e., 1H,13H-tetracosafluoro-7-tridecanone; bis(2H-2-chloro - 1,1,2-trifluoroethyl) ketone, i.e., 1,5-dichloro-1,2,2,4,4,5-hexafluoro-3-pentanone; bis(2H-1,1,2,2-tetrafluoroethyl) ketone; 2H-1,1,2,2-tetrafluoroethyl 12H-hexafluoroisopropyl ketone; 7H-tetradecafluoroheptyl 10H-eicosafluorodecyl ketone; bis(7H-tetradecafluoroheptyl) ketone; and bis(10H-eicosafluorodecyl) ketone.

As the addition coreactants with the just-described polyfluoroperhalo acyclic, polyfluoroperhalo acyclic, and ω-hydropolyfluoroperhalo acyclic ketones to make the new α-mono- and α,α-bis-, i.e., 2-mono- and 2,5-bis-, α,α-bis-polyfluoroperhalo-, -ω-hydropolyfluoroperhalo-, and -polyfluoroperhalocycloalkylene) - substituted hydroxymethyl furans, pyrroles, or thiophenes of the present invention there can be used any pyrrole, furan, or thiophene having hydrogen on at least one α-carbon thereof, i.e., nuclear carbon adjacent the hetero atom, and carrying otherwise on the remaining ring carbons only hydrogen, nitro, halogen, preferably of atomic numbers 9–35 inclusive, and monovalent acyl, acyloxy, and hydrocarbyloxy radicals of no more than eight carbons each. The remaining non-ring valence of the hetero nitrogen in the case of the pyrroles will be satisfied by hydrogen. Thus, there can be used in the preparation of these new products such substituted pyrroles as 2-acetylpyrrole, 3-nitropyrrole, 2-chloropyrrole, 2-n-octyl-oxypyrrole; such substituted thiophenes as 2-chlorothiophene, 3-bromothiophene, 3-iodothiophene, 3-methoxycarbonylthiophene, i.e., methyl 3-thienylcarboxylate, 3-benzoylthiophene; such substituted furans as 3-nitrofuran, 3-bromofuran, and 3-n-butoxyfurane, and the like.

Using the reaction conditions outlined in the foregoing, there will be obtained from the specific 3,3,4,4-tetrafluoro-2,2-dihalocyclobutanones and the α-hydrogen-bearing pyrroles, furans, and thiophenes, just discussed generically and illustrated with suitable specific examples, additional α-(3,3,4,4-tetrafluoro-2,2-dihalo-1-hydroxycyclobutyl)- and α,α'-bis(3,3,4,4-tetrafluoro-2,2-dihalo-1-hydroxycyclobutyl)-substituted pyrroles, furans, and thiophenes of the present invention. More specifically, from equal molar proportions of 2,2-dibromo-3,3,4,4-tetrafluorocyclobutanone and 3-chloropyrrole there will be obtained 2,2-dibromo-3,3,4,4-tetrafluoro-1-(4-chloro-2-pyrrolyl)cyclobutanol. From equal molar proportions of 2,2-dichloro-3,3,4,4-tetrafluorocyclobutanone and 2-acetylpyrrole there will be obtained 2,2-dichloro-3,3,4,4-tetrafluoro-1-(5-acetyl-2-pyrrolyl)cyclobutanol. From equal molar proportions of perfluorocyclobutanone and 3-nitropyrrole there will be obtained 2,2,3,3,4,4-hexafluoro-1-(4-nitro-2-pyrrolyl)cyclobutanol. From equal molar proportions of perfluorocyclobutanone and 2-n-octyloxypyrrole there will be obtained 2,2,3,3,4,4-hexafluoro-1-(5-octyloxypyrrolyl)cyclobutanol. From equal molar proportions of 2-bromo-2-chloro-3,3,4,4-tetrafluorocyclobutanone and 2-chlorothiophene there will be obtained 2-bromo-2-chloro-3,3,4,4-tetrafluoro-1-(5-chlorothienyl)cyclobutanol. From equal molar proportions of 2-bromo-2,3,3,4,4-pentafluorocyclobutanone and 3-bromothiophene there will be obtained 2-bromo-2,3,3,4,4-pentafluoro-1-(4-bromo-2-thienyl)cyclobutanol. From equal molar proportions of perfluorocyclobutaonone and 3-iodothiophene there will be obtained 2,2,3,3,4,4-hexafluoro-1-(4-iodo-2-thienyl)cyclobutanol. From equal molar proportions of 2-chloro-1-2,3,3,4,4-pentafluorocyclobutanone and 3-methoxycarbonyl thiophene there will be obtained 2-chloro-2,3,3,4,4-pentafluoro-1-(4-methoxycarbonyl-2-thienyl)cyclobutanol. From equal molar proportions of 2-bromo-2,3,3,4,4-pentafluorocyclobutanone and 3-benzoylthiophene there will be obtained 2-bromo-2,3,3,4,4-pentafluoro-1-(4-benzoyl-2-thienyl)cyclobutanol. From equal molar proportions of perfluorocyclobutanone and 3-nitrofuran there will be obtained 2,2,3,3,4,4-hexafluoro-1-(4-nitro-2-furyl)cyclobutanol. From equal molar proportions of 2-chloro-2,3,3,4,4-pentafluorocyclobutanone and 3-bromofuran there will be obtained 2-chloro-2,3,3,4,4-pentafluoro-1-(4-bromo-2-furyl)cyclobutanol. From equal molar proportions of perfluorocyclobutanone and 3-n-butoxyfuran there will be obtained 2,2,3,3,4,4-hexafluoro-1-(4-n-butoxy-2-furyl)cyclobutanol. From equimolar proportions of 3-methoxycarbonylfuran and 1,2-dichlorotetrafluoroacetone there will be obtained α,α-bis(chlorodifluoromethyl)-4-methoxycarbonylfuryl methanol. From equimolar proportions of 3-nitrothiophene and perfluorocyclopentanone there will be obtained 1-(4-nitro-2-thienyl)perfluorocyclopentanol, which could also be identified as α,α-octafluorotetramethylene-4-nitrothienylmethanol. From equimolar proportions of 3-methoxypyrrole and 1H,7H-dodecafluoro-3-heptanone there will be obtained α-2H-tetrafluoroethyl-α-4H-octafluorobutyl-4-methoxypyrrolylmethanol. From equimolar proportions of perfluoropentan-2-one and 3-chlorofuran there will be obtained α-trifluoromethyl-α-heptafluoropropyl-4-chlorofurylmethanol. From equimolar proportions of trifluoromethyl perfluorocyclohexyl ketone and 3-bromothiophene there will be obtained α-trifluoromethyl-α-perfluorocyclohexyl-4-bromothienylmethanol. From equimolar proportions of 1,1-dibromotetrafluoroacetone and 3-n-butylpyrrole there will be obtained α-dibromofluoromethyl-α-trifluoromethyl-4-n-butylpyrrolylmethanol. From equimolar proportions of 3,4-dimethoxyfuran and hexafluoroacetone there will be obtained α,α-bis(trifluoromethyl)-3,4-dimethoxyfurylmethanol.

Using two molar proportions of the ketones with the α,α'-dihydrogen-bearing pyrrole, furan, or thiophene coreactants, the α,α'-bis(3,3,4,4-tetrafluoro-2,2-dihalo-1-hydroxycyclobutyl)-substituted pyrroles, furans, and thiophenes will be obtained. Thus, from two molar proportions of 2,2-dibromo-3,3,4,4-tetrafluorocyclobutanone and one molar proportion of 3-chloropyrrole there will be obtained 2,5-pyrrolylenebis(2,2-dibromo-3,3,4,4-tetrafluorocyclobutanol). Similar bis-substituted products will be obtained when the specific coreactants just previously named are used in similar 2:1 molar proportions of the previously described polyfluoroperhalo- and ω-hydropolyfluoroperhaloketones and, respectively, the α,α'-dihydrogen bearing 3- and/or 4-mono- and/or di-functionally substituted furan, pyrrole, and thiophenecoreactants.

Thus, from the foregoing exemplary disclosure, it will be apparent that the new products of this invention can be described by the following generic structural formula wherein:

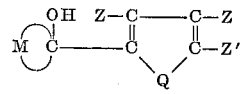

(A) Q is a member of the group consisting of —O—, —NH—, and —S—;
(B) is selected from the group consisting of:
(1) Identical and nonidentical pairs of monovalent polyfluoroperhalo wholly carbon chain radicals of up to 8 chain carbons and monovalent ω-hydropolyfluoroperhalo wholly carbon chain radicals of 2–31 chain carbons, at least one of the members of said pairs of monovalent radicals having 2 fluorine atoms on a carbon alpha to the depicted carbon, all halogen being of atomic number 9–35, and
(2) Single divalent polyfluoroperhalo wholly carbon chain radicals of 3–5 carbons having 2 fluorine atoms on at least one carbon alpha to the depicted carbon, all halogen being of atomic number 9–35;
(C) Z is selected from the group consisting of hydrogen, nitro, halogen, R'CO—, R'COO— and R'O— wherein R' is hydrocarbon of no more than 8 carbons each; and
(D) Z' is selected from the group consisting of Z and

The new 2-mono- and 2,5-bis(dipolyfluoroperhalohydrocarbon-, -di - ω - hydropolyfluoroperhalohydrocarbon-, and -monopolyfluoroperhalocycloalkylene-substituted hydroxymethyl) substituted furans, pyrroles, and thiophenes of the present invention are useful both as intermediates and as end products. Thus, as illustrated in the foregoing examples, the α-mono(3,3,4,4-tetrafluoro-2,2-dihalo-1-hydroxycyclobutyl)- and α,α'-bis(3,3,4,4-tetrafluoro - 2,2 - dihalo - 1 - hydroxycyclobutyl) - substituted furans, pyrroles, and thiophenes are readily convertible by aqueous-based hydrolysis, respectively, to the 2 - (1,1,2,2 - tetrafluoro - 4,4 - dihalobutyryl)furans, pyrroles, and thiophenes and the 2,5-bis(2,2,3,3-tetrafluoro-4,4-dihalobutyryl) pyrroles, furans, and thiophenes. More stringent treatment with aqueous alkali, e.g., at higher temperatures in stronger concentrations, readily converts the 2-(3,3,4,4-tetrafluoro-2,2-dihalo-1-hydroxycyclobutyl) and 2,5-bis(3,3,4,4-tetrafluoro-2,2-dihalo-1-hydroxycyclobutyl) pyrroles, furans, and thiophenes into, respectively, 2-pyrrolylcarboxylic acid, 2-furylcarboxylic acid, 2-thienylcarboxylic acid, and 2,5-pyrrolylene-, -furylene-, and -thienylene-dicarboxylic acids. These latter known dibasic acids have utility in the formation of linear condensation polyamides, polyesters, and polyester-amides by conventional techniques.

These new α-mono- and α,α'-bis(polyfluoroper and -polyfluoro-ω-hydroperhalo)-substituted furans, pyrroles, and thiophenes are generically useful as solvents for highly fluorinated polymers, for instance, the polymers of polyfluorinated olefins. Solutions of such polymers, e.g., polytetrafluoroethylene, polychlorotrifluoroethylene, copolymers thereof or with other ethylenes, and the like, in these polyfluoroper- and polyfluoro-ω-hydroperhalo-substituted furans, pyrroles, and thiophenes are readily obtained by heating the polymers at approximately 1–20% weight concentration in the polyfluoroper- and polyfluoro-ω-hydroperhalo-substituted furans, pyrroles, and thiophenes, conveniently at the reflux. Such solutions are useful in rendering waterproof and water repellent such shaped objects of cellulose as paper, wood, and the like, as well as in forming films and fibers and other shaped products of the polyfluorinated olefin polymers. In addition to their excellent waterproof and water repellent-rendering properties, solutions of these polyfluorinated olefin polymers are also useful in rendering such shaped objects of cellulose non-supportive of combustion or markedly decreasing the tendency such materials normally have for burning. More specifically:

*Example A*

An approximately 20% by weight solution of a low molecular weight, relatively low melting tetrafluoroethylene polymer (melting range, 83–150° C.) in the 2,2,3,3,4,4-hexafluoro-1-(2-furyl)cyclobutanol of Example I was prepared by heating the polymer in the cyclobutanol at the reflux. Strips of filter paper were immersed in the hot solution, removed, dried, and the cyclobutanol solvent completely removed therefrom by treatment with acetone. The thus treated strips were then dried, and on testing it was found that the treated strips were water-repellents and somewhat resistant to burning. In contrast, of course, untreated control strips of the same filter paper were rapidly and completely wet on contact with water and, furthermore, burned rapidly when contacted with a flame.

The same results were obtained using the 2,5-furylenebis(2,2,3,3,4,4-hexafluorocyclobutanol) and the 9-(2,2,3,3,4,4 - hexafluoro - 1 - hydroxycyclobutyl) - 6,9 - epoxy-2,2,3,3,4,4 - hexafluoro - 5 - oxaspiro[3.5]non - 7 - ene of Example I, the 2,2,3,3,4,4-hexafluoro-1-(2-pyrrolyl)-cyclobutanol and the 2,5-pyrrolylenebis(2,2,3,3,4,4-hexafluorocyclobutanol) of Example II, the 2,2,3,3,4,4-hexafluoro-1-(2-thienyl)cyclobutanol, the 2,5-thienylenebis(2,2,3,3,4,4-hexafluorocyclobutanol of Example III, and the 2,2,3,3,4,4 -hexafluoro - 1 - (5 - formyl - 2 - furyl)cyclobutanol of Example IV, and the α,α-bis(trifluoromethyl)-2-pyrrolylmethanol of Example VII.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula

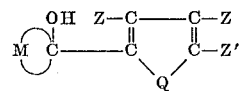

wherein:
(A) Q is a member of the group consisting of —O—, —NH—, and —S—;
(B) M is selected from the group consisting of
   (1) identical and nonidentical pairs of monovalent polyfluoroperhalo wholly carbon chain radicals of up to 8 chain carbons and monovalent ω-hydropolyfluoroperhalo wholly carbon chain radicals of 2–31 chain carbons, at least one of the members of said pairs of monovalent radicals having 2 fluorine atoms on a carbon alpha to the depicted carbon, all halogen being of atomic number 9–35, and
   (2) single divalent polyfluoroperhalo wholly carbon chain radicals of 3–5 carbons having 2 fluorine atoms on at least one carbon alpha to the depicted carbon, all halogen being of atomic number 9–35;
(C) Z is selected from the group consisting of hydrogen, nitro, halogen, R'CO—, R'COO— and R'O wherein R' is hydrocarbon of up to 8 carbon atoms. and
(D) Z' is selected from the group consisting of Z and

2. 2,2,3,3,4,4-hexafluoro-1-(2-furyl)cyclobutanol.
3. 2,5 - furylenebis(2,2,3,3,4,4 - hexafluorocyclobutanol).
4. 2,2,3,3,4,4-hexafluoro-1-(2-pyrrolyl)cyclobutanol.
5. 2,5 - pyrrolylenebis(2,2,3,3,4,4-hexafluorocyclobutanol).
6. 2,2,3,3,4,4-hexafluoro-1-(2-thienyl)cyclobutanol.
7. 2,5 - thienylenebis(2,2,3,3,4,4 - hexafluorocyclobutanol).
8. 2,2,3,3,4,4-hexafluoro - 1 - (5-formyl-2-furyl)-cyclobutanol.
9. α,α-Bis(trifluoromethyl)-2-furylmethanol.
10. α,α-Bis(trifluoromethyl)-2-thienylmethanol.
11. α,α-Bis(trifluoromethyl)-2-pyrrolylmethanol.
12. The process which comprises reacting
(A) a compound of the formula

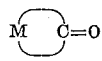

wherein:
M is selected from the group consisting of
   (1) identical and nonidentical pairs of monovalent polyfluoroperhalo wholly carbon chain radicals of up to 8 chain carbons and monovalent ω-hydropolyfluoroperhalo wholly carbon chain radicals of 2–31 chain carbons, at least one of the members of said pairs of monovalent radicals having 2 fluorine atoms on a carbon alpha to the depicted carbons, all halogen being of atomic number 9–35, and
   (2) single divalent polyfluoroperhalo wholly carbon chain radicals of 3–5 carbons having 2 fluorine atoms on at least one carbon alpha to the depicted carbon, all halogen being of atomic number 9–35; with (B) a compound of the formula

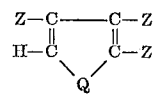

wherein
- (1) Q is a member of the group consisting of —O—, —NR—, and —S—; and
- (2) Z is selected from the group consisting of hydrogen, nitro, halogen, R'CO—, R'COO— and R'O wherein R' is hydrocarbon of up to 8 carbon atoms.

13. The process which comprises reacting perfluorocyclobutanone and pyrrole.

14. The process which comprises reacting perfluorocyclobutanone and thiophene.

15. The process which comprises reacting perfluorocyclobutanone and furfural.

16. The process which comprises reacting perfluoroacetone and pyrrole.

17. The process which comprises reacting perfluoroacetone and thiophene.

18. The process which comprises reacting perfluoroacetone and furan.

No references cited.

NICHOLAS S. RIZZO, *Primary Examiner*.